United States Patent
Brown et al.

(10) Patent No.: US 10,153,648 B2
(45) Date of Patent: *Dec. 11, 2018

(54) VOLTAGE AND POLARITY NEGOTIATION BASED MOBILE DEVICE BATTERY CHARGING

(71) Applicant: INTERNATIONAL BUSINESS MACHINES CORPORATION, Armonk, NY (US)

(72) Inventors: Michael Sean Brown, Wahroonga (AU); James D. Cleaver, Grose Wold (AU); Carlos Felipe F. da Fonseca, Ermington (AU); Gregory D. Lee, North Manly (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/863,307

(22) Filed: Jan. 5, 2018

(65) Prior Publication Data

US 2018/0131210 A1 May 10, 2018

Related U.S. Application Data

(63) Continuation of application No. 15/006,465, filed on Jan. 26, 2016, now Pat. No. 9,935,474.

(51) Int. Cl.
*H01M 10/44* (2006.01)
*H01M 10/46* (2006.01)
(Continued)

(52) U.S. Cl.
CPC ............ *H02J 7/0044* (2013.01); *H02J 7/025* (2013.01); *H02J 50/10* (2016.02); *H02J 50/80* (2016.02); *H02J 50/90* (2016.02)

(58) Field of Classification Search
CPC ........ H02J 7/0021; H02J 7/0026; H02J 7/355; H02J 7/0042
(Continued)

(56) References Cited

U.S. PATENT DOCUMENTS 7,164,255 B2 1/2007 Hui
8,629,654 B2 1/2014 Partovi et al.
(Continued)

FOREIGN PATENT DOCUMENTS

KR 200439257 10/2012
WO 2012132142 10/2012

OTHER PUBLICATIONS

Hui, S.Y.R. et al.; A New Generation of Universal Contactless Battery Charging Platform for Portable Consumer Electronic Equipment; IEEE Transactions on Power Electronics, vol. 20, No. 2; May 2005; p. 620-627.
(Continued)

*Primary Examiner* — Edward Tso
(74) *Attorney, Agent, or Firm* — Schmeiser, Olsen & Watts; Mark C. Vallone (57) ABSTRACT

A method and apparatus for implementing a charging process is provided. The method includes determining that a charging surface of a mobile device is currently located on a charging surface of a structure including a charging apparatus. The charging surface of the mobile device includes charge receiving contacts electrically connected to a battery and a processor. The charging surface of the structure includes charging contacts electrically connected to a charging circuit and in communication with a controller. The processor determines that at least two contacts of the charge receiving contacts are in electro/mechanical contact with at least two contacts of the charging contacts and in response, a negotiation process with the controller with respect to selecting at least one associated charging voltage and polarity for charging the battery is executed resulting in a charging process between the charging circuit and the battery being enabled.

20 Claims, 6 Drawing Sheets

(51) Int. Cl.
*H02J 7/00* (2006.01)
*H02J 7/02* (2016.01)
*H02J 50/10* (2016.01)
*H02J 50/90* (2016.01)
*H02J 50/80* (2016.01)

(58) Field of Classification Search
USPC .............. 320/107, 111, 114, 115, 150, 153
See application file for complete search history.

(56) References Cited

U.S. PATENT DOCUMENTS

| | | |
|---|---|---|
| 2006/0261778 A1 | 11/2006 | Rodarte |
| 2007/0216352 A1 | 9/2007 | Shaddle |
| 2009/0278494 A1 | 11/2009 | Randall |
| 2011/0181244 A1 | 7/2011 | Badger |
| 2012/0169273 A1 | 7/2012 | Liu et al. |
| 2013/0164949 A1 | 6/2013 | Riering-Czekalla et al. |
| 2014/0183269 A1 | 7/2014 | Glaser |
| 2017/0214259 A1 | 7/2017 | Brown et al. |

OTHER PUBLICATIONS

Serra, Jean et al.; Witricity Announces Breakthrough Wireless Charging System for Consumer Electronic Devices Including iPhone 5; Communications for WiTricity, Version 2.0; Jan. 7, 2014; 2 pages.

Zhong, W.X. et al.; A Novel Single-Layer Winding Array and Receiver Coil Structure for Contactless Battery Charging Systems With Free-Positioning and Localized Charging Features; IEEE Transaction on Industrial Electronics, Vo. 58, No. 9; Sep. 2011. p. 4136-4144.

Friedman, Mark J.; List of IBM Patents or Patent Applications Treated as Related; Dec. 5, 2017; 1 page.

VOLTAGE AND POLARITY NEGOTIATION BASED MOBILE DEVICE BATTERY CHARGING

CROSS REFERENCE TO RELATED APPLICATIONS

This application is a continuation application claiming priority to Ser. No. 15/006,465 filed Jan. 26, 2016, the contents of which are hereby incorporated by reference.

FIELD

The present invention relates generally to an apparatus for charging a power source and in particular to an apparatus and associated method for negotiating charging voltages and an associated polarity for use in a charging process.

BACKGROUND

Current sources requiring power are typically associated with a limited operational time frame. Limited operational time frames typically result in an interruption of current activities thereby preventing completion of operational tasks. Likewise, charging a source may require a complex process that may be time consuming and require a large amount of resources. Accordingly, there exists a need in the art to overcome at least some of the deficiencies and limitations described herein above.

SUMMARY

A first aspect of the invention provides a mobile device charging method comprising: first determining, by a processor of a mobile device, that a charging surface of the mobile device is currently located on a charging surface of a structure comprising a charging apparatus, wherein the charging surface of the mobile device comprises a plurality of charge receiving contacts electrically connected to a battery and in communication with the processor, and wherein the charging surface of the structure comprises a plurality of charging contacts electrically connected to a charging circuit and in communication with a controller; second determining, by the processor, that at least two contacts of the plurality of charge receiving contacts are in electro/mechanical contact with at least two contacts of the plurality of charging contacts; executing, by the processor in response to results of the second determining, a negotiation process with the controller with respect to selecting at least one associated charging voltage and polarity for charging the battery; and enabling, by the processor in response to results of the negotiation process, a charging process between the charging circuit and the battery.

A second aspect of the invention provides computer program product, comprising a computer readable hardware storage device storing a computer readable program code, the computer readable program code comprising an algorithm that when executed by a processor of a mobile device implements a charging method, the method comprising: first determining, by the processor, that a charging surface of the mobile device is currently located on a charging surface of a structure comprising a charging apparatus, wherein the charging surface of the mobile device comprises a plurality of charge receiving contacts electrically connected to a battery and in communication with the processor, and wherein the charging surface of the structure comprises a plurality of charging contacts electrically connected to a charging circuit and in communication with a controller; second determining, by the processor, that at least two contacts of the plurality of charge receiving contacts are in electro/mechanical contact with at least two contacts of the plurality of charging contacts; executing, by the processor in response to results of the second determining, a negotiation process with the controller with respect to selecting at least one associated charging voltage and polarity for charging the battery; and enabling, by the processor in response to results of the negotiation process, a charging process between the charging circuit and the battery.

A third aspect of the invention provides a mobile device comprising a processor coupled to a computer-readable memory unit, the memory unit comprising instructions that when executed by the processor executes a charging method comprising: first determining, by the processor, that a charging surface of the mobile device is currently located on a charging surface of a structure comprising a charging apparatus, wherein the charging surface of the mobile device comprises a plurality of charge receiving contacts electrically connected to a battery and in communication with the processor, and wherein the charging surface of the structure comprises a plurality of charging contacts electrically connected to a charging circuit and in communication with a controller; second determining, by the processor, that at least two contacts of the plurality of charge receiving contacts are in electro/mechanical contact with at least two contacts of the plurality of charging contacts; executing, by the processor in response to results of the second determining, a negotiation process with the controller with respect to selecting at least one associated charging voltage and polarity for charging the battery; and enabling, by the processor in response to results of the negotiation process, a charging process between the charging circuit and the battery.

The present invention advantageously provides a simple method and associated system capable of charging a power source.

DETAILED DESCRIPTION

Figure 1:
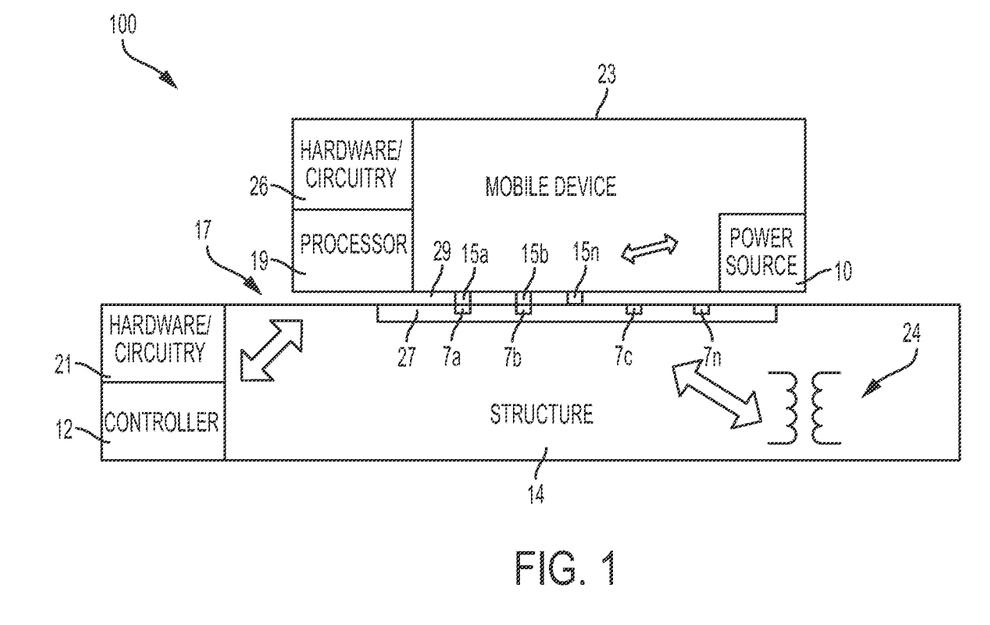
FIG. 1 illustrates a system for negotiating charging voltages and an associated polarity for use in a charging process, in accordance with embodiments of the present invention.

FIG. 1 illustrates a system 100 for negotiating charging voltages and an associated polarity for use in a charging process, in accordance with embodiments of the present invention. System 100 enables a process for charging a power source 10 (e.g., a battery) in a mobile device 23 device via a surface 17 of a structure 14 (e.g., a table, a counter, deck, stand, etc.). Surface 17 comprises a charging portion 27 comprising electrically conductive contacts 7a . . . 7n connected to a (back end) controller 12, hardware/circuitry 21, and a powered transformer and associated charging circuitry 24 (e.g., a rectifier, a voltage regulator, a voltage divider, etc.) within structure 14. Mobile device 23 comprises a charging strip 29 comprising electrically conductive contacts 15a . . . 15n connected to a processor, 19, hardware/circuitry 26, and power source 10. A charging process is initiated when mobile device 23 is placed on surface 17. In response, processor 19 in combination with hardware/circuitry 26 and/or controller 12 in combination with hardware/circuitry 21 performs a check to determine if each of electrically conductive contacts 15a . . . 15n is in electrical contact with at least two of electrically conductive contacts 7a . . . 7n. Additionally, processor 19 in combination with hardware/circuitry 26 and/or controller 12 in combination with hardware/circuitry 21 may determine which of electrically conductive contacts 15a . . . 15n in electrical contact with electrically conductive contacts 7a . . . 7n comprise a most reliable connection. When system 100 determines that two reliable contact points have been detected (between electrically conductive contacts 15a . . . 15n and electrically conductive contacts 7a . . . 7n), processor 19 in combination with hardware/circuitry 26 and controller 12 in combination with hardware/circuitry 21 execute a negotiation process to determine a specified charging voltage and associated polarity for enabling powered transformer and associated charging circuitry 24 to charge power source 10. The specified charging voltage and associated polarity is applied to power source 10 via electrically conductive contacts 7a . . . 7n. For example, the negotiation process may determine that 12 volts should be applied to electrically conductive contacts 7a and 7b with a positive voltage signal (12 volts) applied to contact 7a and a negative signal (a ground or reference signal) applied to contact 7b. The 12 volt signal is applied to power source 10 via electrically conductive contacts 15a and 15b. Powered transformer and associated charging circuitry 24 comprises circuitry (voltage regulators, relays, etc.) for generating differing voltage signals (based on commands from processor 19, hardware/circuitry 26, controller 12, and/or hardware/circuitry 21) and specified polarities. Additionally, hardware/circuitry 26 may include a GPS enabled circuit for determining a location of mobile device 23 and requesting an appropriate voltage and/or frequency based on a specific country location. Hardware/circuitry 26 and/or hardware/circuitry 21 may comprise sensors for detecting conditions requiring a voltage change for charging power source 10. For example, hardware/circuitry 21 may comprise a temperature sensor (e.g., a thermocouple) that sends temperature readings (transformer and associated charging circuitry 24) to hardware/circuit 21 and controller 12. In response, hardware/circuit 21 and controller 12 may determine that a temperature for transformer and associated charging circuitry 24 has exceeded a predetermined threshold temperature (i.e., is too hot) and therefore, the charging voltage should be reduced or the charging process should be terminated. Data indicating the determination is transmitted to processor 19 and hardware/circuitry 26 and a new negotiation process is executed resulting in a change for the charging process. Additionally, analog and/or digital data (e.g., the determination data) may be transmitted between processor 19 and controller 12 via conductive contacts 15a . . . 15n and electrically conductive contacts 7a . . . 7n.

If mobile device 23 is moved and connections between electrically conductive contacts 15a . . . 15n and electrically conductive contacts 7a . . . 7n are broken, electrically conductive contacts 7a . . . 7n revert back to a low (data level) voltage and wait for the next contact.

Mobile device 23 and/or a charging system of structure 14 (i.e., hardware circuit 21, controller 12, and powered transformer and associated charging circuitry 24) each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, controller 12, hardware/circuitry 21, powered transformer and associated charging circuitry 24, hardware/circuitry 26, and processor 19 may each comprise a specialized hardware device comprising specialized (non-generic) hardware and circuitry (i.e., specialized discrete non-generic analog, digital, and logic based circuitry) for executing a process described with respect to FIGS. 1-5. The specialized discrete non-generic analog, digital, and logic based circuitry may include proprietary specially designed components (e.g., a specialized integrated circuit designed for only implementing an automated process for negotiating charging voltages and an associated polarity for use in a charging process.

System 100 enables the following negotiation process with respect to a charging process:

1. Mobile device 23 registers it's presence on structure 14.
2. Structure 14 responds to the registration with a range of voltages for charging.
3. Mobile device 23 requests an appropriate voltage for charging power source 10.
4. Structure 14 supplies the requested voltage over determined connected electrically conductive contacts.

Figure 2:
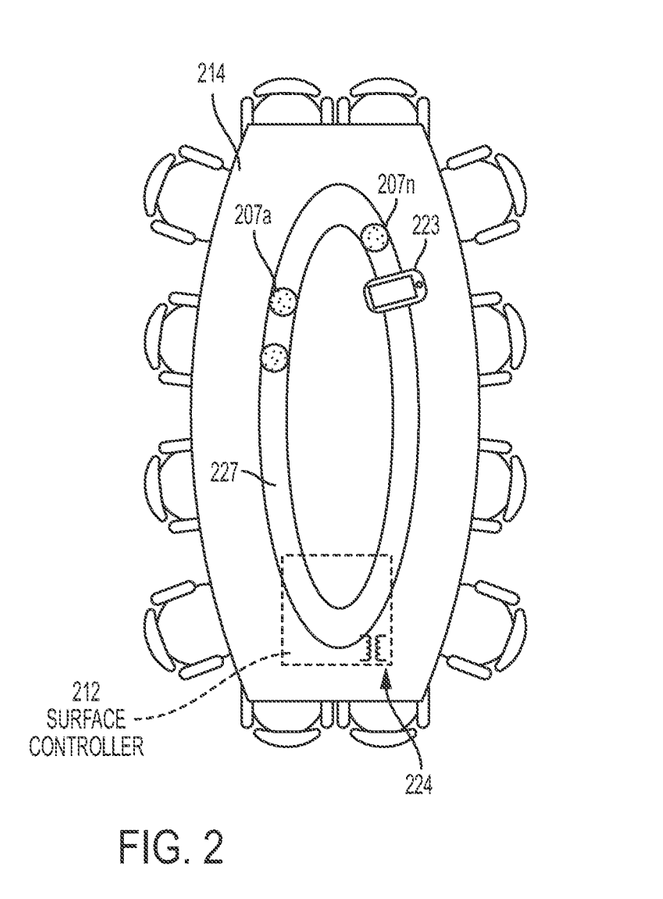
FIG. 2 illustrates a detailed view of a structure used in a charging process described with respect to FIG. 1, in accordance with embodiments of the present invention.

FIG. 2 illustrates a detailed view of a structure 214 used in a charging process described with respect to FIG. 1, in accordance with embodiments of the present invention. Structure 214 illustrates a detailed view of structure 14 of FIG. 1. Structure 214 comprises a charging portion 227 comprising electrically conductive contacts 207a . . . 207n connected to a controller 212 (including specialized hardware circuitry) and a powered transformer and associated charging circuitry 224 (e.g., a rectifier, a voltage regulator, a voltage divider, etc.) within structure 214. Electrically conductive contacts 207a . . . 207n are configured to make contact with electrically conductive contacts on a mobile device 223 to enable a charging process for charging a power source of mobile device 223.

Figure 3:
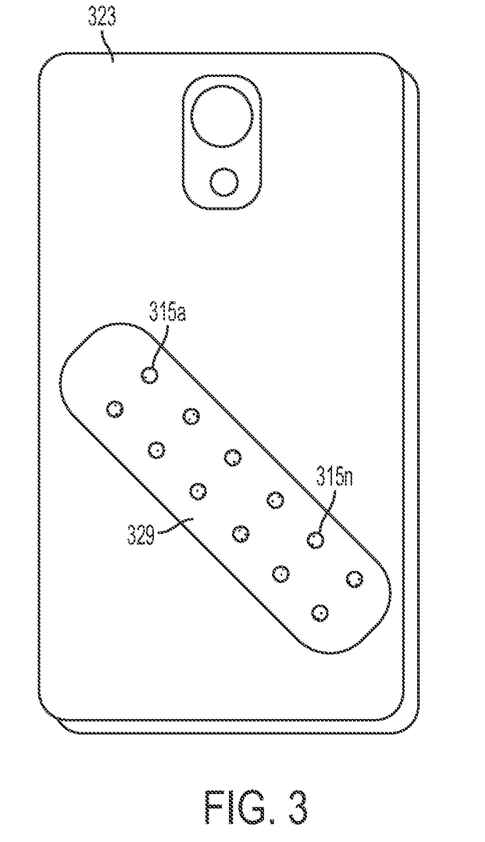
FIG. 3 illustrates a detailed view of a mobile device used in a charging process described with respect to FIG. 1, in accordance with embodiments of the present invention.

FIG. 3 illustrates a detailed view of a mobile device 323 used in a charging process described with respect to FIG. 1, in accordance with embodiments of the present invention. Mobile device 323 illustrates a detailed view of mobile device 23 of FIG. 1. Mobile device 323 comprises a charging strip 329 comprising electrically conductive contacts 315a . . . 315n connected to a processor, hardware/circuitry, and power source as described with respect to FIG. 1, supra.

Figure 4:
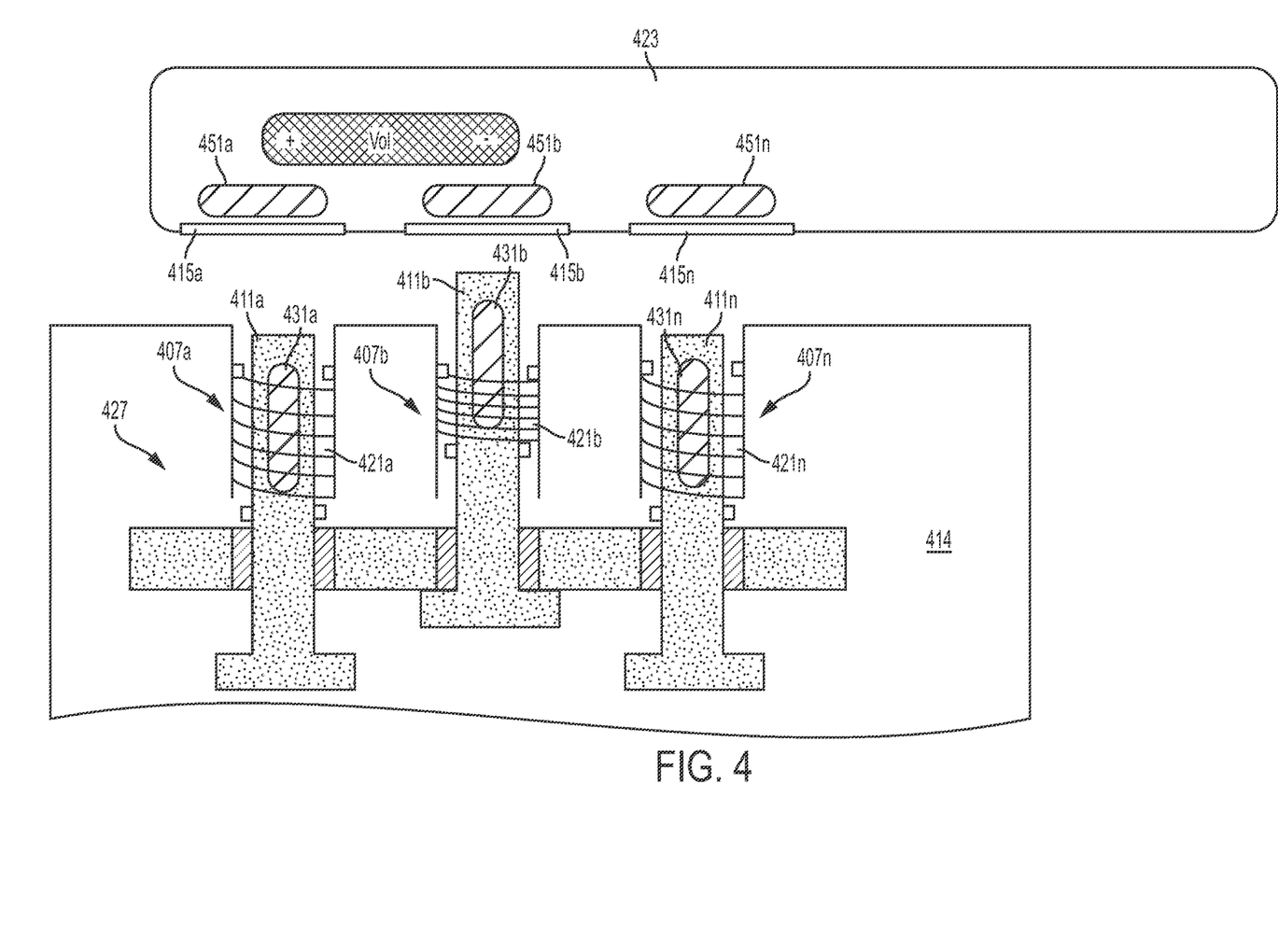
FIG. 4 illustrates a detailed view of a mobile device making contact with a structure as described with respect to FIG. 1, in accordance with embodiments of the present invention.

FIG. 4 illustrates an example detailed view of a mobile device 423 making contact with a structure 414 as described with respect to FIG. 1, in accordance with embodiments of the present invention. The view illustrated in FIG. 1 details an example of a contact configuration utilizing spring loaded contacts to provide a flush surface when not in use. Mobile device 323 comprises electrically conductive (and optionally magnetic with magnets 451a . . . 451n) contacts 415a . . . 415n connected to a processor, hardware/circuitry, and power source as described with respect to FIG. 1, supra. Structure 414 comprises a charging portion 427 comprising electrically conductive contacts 407a . . . 407n (and optionally magnetic and/or spring loaded comprising springs 421a . . . 421n) connected to a controller (including specialized hardware circuitry) and a powered transformer and associated charging circuitry (e.g., a rectifier, a voltage regulator, a voltage divider, etc.) within structure 414. Electrically conductive contacts 407a . . . 407n comprise movable (sliding) contacts 411a . . . 411n comprising springs and/or magnetic portions 431a . . . 431n, respectively. Electrically conductive contacts 407a . . . 407n are configured to make contact with electrically conductive contacts 415a . . . 415n to enable a charging process for charging a power source of mobile device 423.

Figure 5:
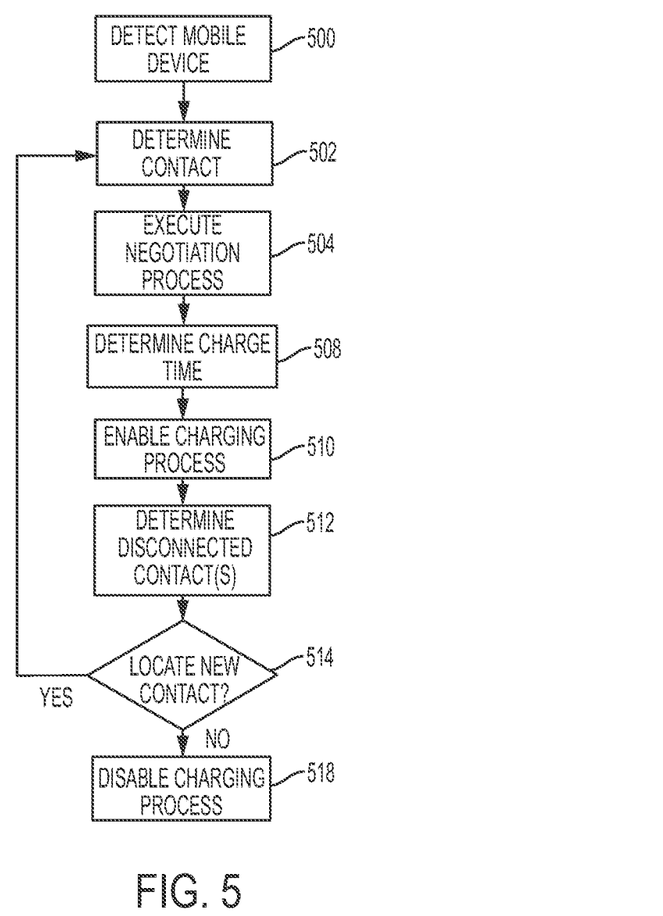
FIG. 5 illustrates a flowchart detailing a process enabled by system 100 of FIG. 1 for negotiating charging voltages and an associated polarity for use in a charging process, in accordance with embodiments of the present invention.

FIG. 5 illustrates a flowchart detailing a process enabled by system 100 of FIG. 1 for negotiating charging voltages and an associated polarity for use in a charging process, in accordance with embodiments of the present invention. Each of the steps in the algorithm of FIG. 5 may be enabled and executed in any order by a computer processor(s) executing computer code. In step 500, a processor of a mobile device determines that a charging surface of the mobile device is currently located on a charging surface of a structure comprising a charging apparatus. The charging surface of the mobile device comprises charge receiving contacts electrically connected to a battery and in communication with the processor. The charging surface of the structure comprises charging contacts electrically connected to a charging circuit and in communication with an internal controller. In step 502, it is determined that at least two contacts of the charge receiving contacts are in electro/mechanical contact with at least two contacts of the charging contacts. In step 504, a negotiation process between the processor and the controller is executed with respect to selecting at one associated charging voltage and polarity for charging the battery. The negotiation process may include: receiving (from the controller) data indicating a range of voltages capable of being supplied by the charging circuit and transmitting a request for a first charging voltage value (selected from the range of voltages) for charging the battery. Additionally, the negotiation process may include: transmitting an additional request for a second voltage value differing from the first voltage value for charging the battery. In step 508, a specified time period associated execution of the charging process may be requested. In step 510, a charging process between the charging circuit and the battery is enabled. The charging process may include receiving (by the battery from the charging circuit) (via said at least two contacts of the charge receiving contacts and at least two contacts of the charging contacts) a voltage associated with the first voltage value with respect to an associated polarity. Additionally, the voltage associated with the first voltage vale may be received for the specified time period determined in step 508. In step 512, it is determined that the at least two contacts of the charge receiving contacts is no longer in electro/mechanical contact with the at least two contacts of the charging contacts. In step 514, it is determined if new charge receiving contacts and charging contact pairs should be located. If it is determined that new charge receiving contacts and charging contact pairs should be located then step 502 is repeated to locate new or alternative contact pairs. If it is determined that new charge receiving contacts and charging contact pairs should not be located then in step 518 the charging process between the charging circuit and the battery is disabled.

Figure 6:
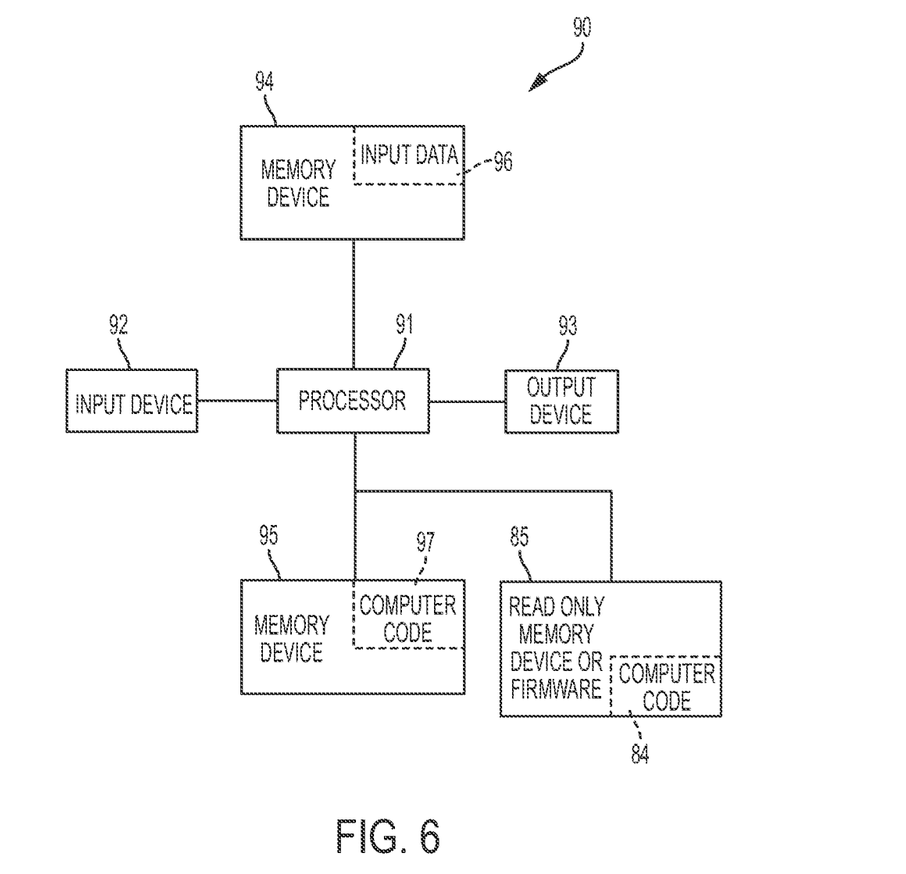
FIG. 6 illustrates a computer system used by the system of FIG. 1 for enabling a process for negotiating charging voltages and an associated polarity for use in a charging process, in accordance with embodiments of the present invention.

FIG. 6 illustrates a computer system 90 (e.g., mobile device 23 and/or controller and/or hardware/circuitry 26 of structure 14 of FIG. 1) used by or comprised by the system of FIG. 1 for enabling a process for negotiating charging voltages and an associated polarity for use in a charging process, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 5) for enabling a process for negotiating charging voltages and an associated polarity for use in a charging process. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithm of FIG. 5 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 5) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to negotiate charging voltages and an associated polarity for use in a charging process. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for negotiating charging voltages and an associated polarity for use in a charging process. In another embodiment, the invention provides a business method that performs the process steps of the invention on a subscription, advertising, and/or fee basis. That is, a service supplier, such as a Solution Integrator, could offer to enable a process for negotiating charging voltages and an associated polarity for use in a charging process. In this case, the service supplier can create, maintain, support, etc. a computer infrastructure that performs the process steps of the invention for one or more customers. In return, the service supplier can receive payment from the customer(s) under a subscription and/or fee agreement and/ or the service supplier can receive payment from the sale of advertising content to one or more third parties.

While FIG. 6 shows the computer system 90 as a particular configuration of specialized hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A mobile device battery charging improvement method comprising:
   first determining, by a processor of a mobile device, that a charging surface of said mobile device is currently located on a charging surface of a structure comprising a charging apparatus, wherein said charging surface of said mobile device comprises a plurality of charge receiving contacts electrically connected to a battery and in communication with said processor, and wherein said charging surface of said structure comprises a plurality of charging contacts electrically connected to a charging circuit and in communication with a controller;
   executing, by said processor in response to results of second determining that at least two contacts of said plurality of charge receiving contacts are in electro/mechanical contact with at least two contacts of said plurality of charging contacts, a negotiation process with said controller with respect to selecting at least one associated charging voltage and polarity for charging said battery; and
   enabling, by said processor in response to results of said negotiation process, a charging process between said charging circuit and said battery, wherein said charging process comprises:
      receiving, by said processor from temperature sensors and circuitry of said structure first temperature readings associated with a temperature of a transformer and associated charging circuitry of said structure;
      detecting, by said processor enabling temperature sensors and circuitry of said mobile device, a temperature reading of said structure;
      activating, by said processor based on said first temperature readings and said temperature reading of said structure, a voltage regulator and a relay, of said structure, such that a voltage signal is generated, via said transformer and said voltage regulator, and transferred through said relay from said at least two contacts of said plurality of charging contacts to said at least two contacts of said plurality of charge receiving contacts resulting in said battery being automatically charged.

2. The method of claim 1, wherein said negotiation process comprises:
   receiving, by said processor from said controller, data indicating a range of voltages capable of being supplied by said charging circuit; and
   transmitting, by said processor to said controller, a request for a first voltage value, selected from said range of voltages, for charging said battery.

3. The method of claim 2, wherein said charging process comprises:
   receiving in response to said request, by said battery from said charging circuit via said at least two contacts of said plurality of charge receiving contacts and said at least two contacts of said plurality of charging contacts, a first voltage associated with said first voltage value with respect to an associated polarity.

4. The method of claim 3, further comprising:
   requesting, by said processor, a specified time period associated with said charging process, and wherein said charging process further comprises receiving said first voltage for said specified time period.

5. The method of claim 4, wherein said negotiation process further comprises:
   transmitting, by said processor to said controller, an additional request for a second voltage value differing from said first voltage value, selected from said range of voltages, for charging said battery; and
   after said receiving said first voltage for said specified time period, receiving in response to said additional request, by said battery from said charging circuit via said at least two contacts of said plurality of charge receiving contacts and said at least two contacts of said plurality of charging contacts, a second voltage associated with said second voltage value with respect to said associated polarity.

6. The method of claim 1, further comprising:
   determining, by said processor, that said at least two contacts of said plurality of charge receiving contacts in electro/mechanical contact with at least two contacts of said plurality of charging contacts comprises a more reliable connection with respect to any other electro-mechanical contact between any of said plurality of charge receiving contacts and said plurality of charging contacts.

7. The method of claim 1, further comprising:
   additionally determining, by said processor, that said at least two contacts of said plurality of charge receiving contacts is no longer in electro/mechanical contact with at least two contacts of said plurality of charging contacts, and wherein said method further comprises:
   disabling, by said processor in response to results of said additionally determining, said charging process between said charging circuit and said battery.

8. The method of claim 7, further comprising:
   third determining, by said processor, that an alternative pair of contacts of said plurality of charge receiving contacts is in electro/mechanical contact with an alternative pair of contacts of said plurality of charging contacts;
   executing, by said processor in response to results of said third determining, an additional negotiation process with said controller with respect to selecting another associated charging voltage and polarity for charging said battery; and enabling, by said processor in response to results of said additional negotiation process, an additional charging process between said charging circuit and said battery.

9. The method of claim 1, wherein each of said plurality of charge receiving contacts and said plurality of charging contacts comprise spring loaded electro/magnetic contacts.

10. The method of claim 1, wherein each of said plurality of charge receiving contacts and said plurality of charging contacts comprise weight loaded electro/magnetic contacts.

11. The method of claim 1, further comprising:
enabling, by said processor, transmission of analog or digital data between said processor and said controller via said least two contacts of said plurality of charge receiving and said at two contacts of said plurality of charging contacts.

12. The method of claim 1, further comprising:
third determining, by said processor, that an additional two contacts of said plurality of charge receiving contacts is in electro/mechanical contact with an additional two contacts of said plurality of charging contacts; and
fourth determining, by said processor, that said additional two contacts of said plurality of charge receiving contacts in electro/mechanical contact with said additional two contacts of said plurality of charging contacts comprise a more suitable set of charging contacts, with respect to said charging process, than said least two contacts of said plurality of charge receiving contacts in electro/mechanical contact with said at least two contacts of said plurality of charging contacts, wherein said charging process is performed via said additional two contacts of said plurality of charge receiving contacts in electro/mechanical contact with said additional two contacts of said plurality of charging contacts.

13. The method of claim 1, further comprising:
providing at least one support service for at least one of creating, integrating, hosting, maintaining, and deploying computer-readable code in the control hardware, said code being executed by the computer processor to implement: said first determining, determining, said executing, and said enabling.

14. A computer program product, comprising a computer readable hardware storage device storing a computer readable program code, said computer readable program code comprising an algorithm that when executed by a processor of a mobile device implements a battery charging improvement method, said method comprising:
first determining, by said processor, that a charging surface of said mobile device is currently located on a charging surface of a structure comprising a charging apparatus, wherein said charging surface of said mobile device comprises a plurality of charge receiving contacts electrically connected to a battery and in communication with said processor, and wherein said charging surface of said structure comprises a plurality of charging contacts electrically connected to a charging circuit and in communication with a controller;
executing, by said processor in response to results of second determining that at least two contacts of said plurality of charge receiving contacts are in electro/mechanical contact with at least two contacts of said plurality of charging contacts, a negotiation process with said controller with respect to selecting at least one associated charging voltage and polarity for charging said battery; and enabling, by said processor in response to results of said negotiation process, a charging process between said charging circuit and said battery, wherein said charging process comprises:
receiving, by said processor from temperature sensors and circuitry of said structure first temperature readings associated with a temperature of a transformer and associated charging circuitry of said structure;
detecting, by said processor enabling temperature sensors and circuitry of said mobile device, a temperature reading of said structure;
activating, by said processor based on said first temperature readings and said temperature reading of said structure, a voltage regulator and a relay, of said structure, such that a voltage signal is generated, via said transformer and said voltage regulator, and transferred through said relay from said at least two contacts of said plurality of charging contacts to said at least two contacts of said plurality of charge receiving contacts resulting in said battery being automatically charged.

15. The computer program product of claim 14, wherein said negotiation process comprises:
receiving, by said processor from said controller, data indicating a range of voltages capable of being supplied by said charging circuit; and
transmitting, by said processor to said controller, a request for a first charging voltage value, selected from said range of voltages, for charging said battery.

16. The computer program product of claim 15, wherein said charging process comprises:
receiving in response to said request, by said battery from said charging circuit via said at least two contacts of said plurality of charge receiving contacts and said at least two contacts of said plurality of charging contacts, a first voltage associated with said first voltage value with respect to an associated polarity.

17. The computer program product of claim 16, wherein said method further comprises:
requesting, by said processor, a specified time period associated with said charging process, and wherein said charging process further comprises receiving said first voltage for said specified time period.

18. The computer program product of claim 17, wherein said negotiation process further comprises:
transmitting, by said processor to said controller, an additional request for a second charging voltage value differing from said first voltage value, selected from said range of voltages, for charging said battery; and
after said receiving said first voltage for said specified time period, receiving in response to said additional request, by said battery from said charging circuit via said at least two contacts of said plurality of charge receiving contacts and said at least two contacts of said plurality of charging contacts, a second voltage associated with said second voltage value with respect to said associated polarity.

19. The computer program product of claim 14, wherein said method further comprises:
determining, by said processor, that said at least two contacts of said plurality of charge receiving contacts in electro/mechanical contact with at least two contacts of said plurality of charging contacts comprises a more reliable connection with respect to any other electro-mechanical contact between any of said plurality of charge receiving contacts and said plurality of charging contacts.

20. A mobile device comprising a processor coupled to a computer-readable memory unit, said memory unit comprising instructions that when executed by the processor executes a battery charging improvement method comprising:

first determining, by said processor, that a charging surface of said mobile device is currently located on a charging surface of a structure comprising a charging apparatus, wherein said charging surface of said mobile device comprises a plurality of charge receiving contacts electrically connected to a battery and in communication with said processor, and wherein said charging surface of said structure comprises a plurality of charging contacts electrically connected to a charging circuit and in communication with a controller;

executing, by said processor in response to results of second determining that at least two contacts of said plurality of charge receiving contacts are in electro/mechanical contact with at least two contacts of said plurality of charging contacts, a negotiation process with said controller with respect to selecting at least one associated charging voltage and polarity for charging said battery; and enabling, by said processor in response to results of said negotiation process, a charging process between said charging circuit and said battery, wherein said charging process comprises:

receiving, by said processor from temperature sensors and circuitry of said structure first temperature readings associated with a temperature of a transformer and associated charging circuitry of said structure;

detecting, by said processor enabling temperature sensors and circuitry of said mobile device, a temperature reading of said structure;

activating, by said processor based on said first temperature readings and said temperature reading of said structure, a voltage regulator and a relay, of said structure, such that a voltage signal is generated, via said transformer and said voltage regulator, and transferred through said relay from said at least two contacts of said plurality of charging contacts to said at least two contacts of said plurality of charge receiving contacts resulting in said battery being automatically charged.

* * * * *